(12) United States Patent
Franke

(10) Patent No.: US 8,662,909 B2
(45) Date of Patent: Mar. 4, 2014

(54) FAST COUPLING APPARATUS FOR CONNECTING MEDIA-CARRYING LINES

(75) Inventor: Andreas Franke, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/604,555

(22) Filed: Sep. 5, 2012

(65) Prior Publication Data

US 2013/0059456 A1 Mar. 7, 2013

(30) Foreign Application Priority Data

Sep. 5, 2011 (DE) .......................... 10 2011 053 260

(51) Int. Cl.
*H01R 4/64* (2006.01)
(52) U.S. Cl.
USPC ............................. 439/192; 439/92; 439/181
(58) Field of Classification Search
USPC ......... 439/92, 181, 191, 192; 251/149, 149.1; 137/798; 285/305, 308
See application file for complete search history.

(56) References Cited

U.S. PATENT DOCUMENTS

| 3,891,290 | A  | * | 6/1975  | Marshall ........................ 439/192 |
| 5,358,410 | A  | * | 10/1994 | Kieserling et al. ............ 439/164 |
| 8,435,058 | B2 | * | 5/2013  | Franke ........................... 439/181 |
| 2001/0037795 | A1 |   | 11/2001 | Stieler |
| 2008/0078880 | A1 | * | 4/2008  | Petit ........................... 244/135 R |
| 2013/0059456 | A1 | * | 3/2013  | Franke .......................... 439/192 |

FOREIGN PATENT DOCUMENTS

| DE | 19915373 A1 | 10/1999 |
| EP | 1443255 A1  | 8/2004  |
| GB | 1565530     | 12/1976 |

* cited by examiner

*Primary Examiner* — James Harvey
(74) *Attorney, Agent, or Firm* — Julia Voutyras; Alleman Hall McCoy Russell & Tuttle LLP

(57) ABSTRACT

A fast coupling apparatus on a media-carrying line is provided. The fast coupling apparatus includes a plug piece arranged on a first line end and a receiver piece arranged on a second line end coupled together with the plug piece, where an electrically-conductive contact sleeve is arranged on an inner periphery of the receiver piece, the electrically-conductive contact sleeve is electrically-conductively connected with the receiver piece and has a contact lip that protrudes from a surface of the contact sleeve and touches the plug piece in a connected position.

18 Claims, 2 Drawing Sheets

FAST COUPLING APPARATUS FOR CONNECTING MEDIA-CARRYING LINES

CROSS-REFERENCE TO RELATED APPLICATIONS

This application claims priority to German Patent Application Number 102011053260.9 filed on Sep. 5, 2011, the entire contents of which are hereby incorporated herein by reference for all purposes.

FIELD

The present invention relates to a coupling apparatus releasably coupling ends of a media-carrying lines, such as hoses in a motor vehicle.

BACKGROUND/SUMMARY

Fast coupling apparatuses, such as quick connectors, may be used to connect two line ends together in motor vehicles. The fast coupling apparatuses may have an inner part that can be coaxially inserted into an outer part, may engage with the outer part when mated. Such fast coupling apparatuses may be used in motor vehicle construction to join fuel lines together or to join fuel lines to plug pieces formed on or attached to fuel containers or fuel distributors. These connectors enable simple handing, easy installation, and a sealed connection after engagement of the plug piece in the coupling housing. However, to facilitate removal and/or repair the coupling may also be configured to release after being mated. Certain types of quick connectors are shown in SAE J2044.

However, electrostatic charge from the flowing fuel may develop in fuel lines. Electrostatic charge in the fuel lines increases the likelihood of fuel igniting in the fuel lines or in other undesirable placed in the vehicle, thereby decreasing vehicle safety. To ensure the electrical diversion of such a charge, in fuel supply systems the components or complete assemblies in the fuel flow may be made of conductive material and connected to the vehicle ground. This may be done via electric lines or by direct connection to the vehicle ground. In such an example the vehicle chassis and the components of the line system may be brought to the same potential and thus a charge build-up is reduced. Consequently, in particular at the points connecting the individual fuel lines to each other or to system components, a threshold amount of electrical conductivity may be desired to reduce the likelihood of charge build up.

Because of production tolerances and other design objectives (e.g., low insertion force) a plug piece in the fast coupling apparatus may not be in direct mechanical contact with a housing or receiver piece. Additionally, insulation may be included in the fast coupling apparatus, thereby reducing (e.g., inhibiting) the transfer of electricity between some components in the fast coupling apparatus. Therefore, in previous fast coupling apparatuses relatively high voltages may be needed to bridge the gap between the plug piece and the receiver piece. Attempts have been made to use conductive O-rings in the receiver piece to help with electricity transfer. However, the conductive O-rings may be costly and have a large material resistance as well as other disadvantages.

The Inventors have recognized the disadvantages with the approaches previously described. As such in one approach, a fast coupling apparatus for releasable connection of ends of media-carrying lines or hoses, in particular for fuel lines in motor vehicles, is provided. The fast coupling apparatus includes a plug piece arranged on a first line end and a receiver piece arranged on a second line end coupled together with the plug piece, where an electrically-conductive contact sleeve is arranged on an inner periphery of the receiver piece, the electrically-conductive contact sleeve is electrically-conductively connected with the receiver piece and has a contact lip that protrudes from a surface of the contact sleeve and touches the plug piece in a connected position.

The conductive contact sleeve provides a low electrical contact resistance of the plug piece to be connected with the receiver piece and thus enables a reliable electrical connection between the lines connected by the fast coupling apparatus. In this way, electrostatic charge may be diverted and/or reduced in the fast coupling apparatus. As a result, the safety of the fast coupling apparatus is increased, due to the reduction in electrostatic charge. Furthermore the plug piece may be releasably coupled to the receiver piece, enabling the receiver piece to be disconnected and re-connected to the plug piece when desired, such as during maintenance and/or repair.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
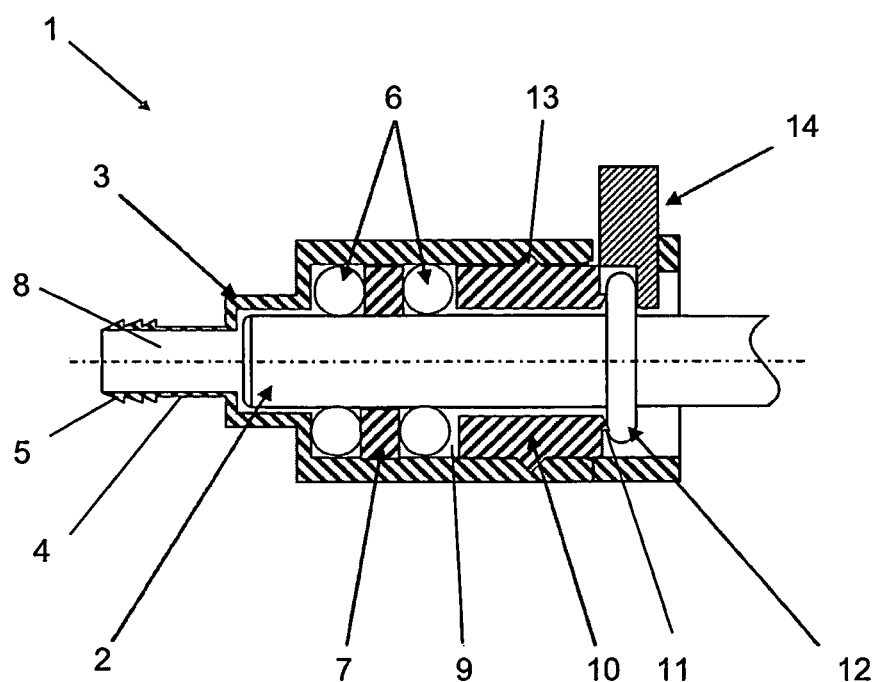
FIG. 1 shows a side section view of an example fast coupling apparatus.

A fast coupling apparatus for releasable connection of ends of media-carrying lines or hoses is described herein, in particular for fuel lines in motor vehicles in some examples. As described herein a media may be a liquid, such as a fuel (e.g., gasoline, alcohol, diesel, bio-diesel, etc.), a gas (e.g., air, natural gas), a vapor (e.g., fuel vapor, water vapor), etc. The fast coupling apparatus may have a plug piece and a receiver piece which are each coupled to (e.g., mounted) on a line end and can be coupled together media-tight, wherein on the inner periphery of the receiver piece is arranged an electrically-conductive sleeve connected electrically-conductively with the receiver piece, which sleeve or ring has a contact lip that protrudes from its surface and touches the plug piece in the connection position. The contact sleeve may be a contact ring. The contact lip enables a reliable, electrically-conductive connection between the plug piece and the receiver piece in the connection position. The electrical resistance across the plug piece and the receiver piece is thereby significantly reduced since the plug piece and the receiver piece are in contact with each other via the contact lip. The contact lip this example may not be constrained by design tolerances relating to the fast coupling apparatus. Thus, the contact resistance is not substantially affected by the production tolerances of the fast coupling apparatus.

The electrically-conductive contact lip may be made of a flexible material if desired so that in the process of inserting the plug piece in the receiver piece, it can yield flexibly within certain limits of the push-in force of the plug piece, in particular the component of the push-in force acting on the contact lip in the insertion process. The elastic resilience of the contact lip enables a reliable electrical contact between the plug piece and the receiver piece irrespective of the production or specification tolerances of the fast coupling apparatus, in particular of the plug piece and the receiver piece, if desired.

On the outer periphery of the plug piece may be formed a collar element on which the contact lip, oriented parallel to the longitudinal extension of the plug piece, lies in the connection position. This allows a process of inserting the plug piece in the receiver piece with particularly low insertion force if desired, since the contact lip is not already in contact with the plug piece at the start of the insertion process as would be the case for example if the contact lip were to extend in the radial direction to the plug piece, wherein the contact lip would then touch the plug piece on the outer periphery. When the insertion process is completed, the collar element (e.g., flange element) formed on the outer periphery of the plug piece may come into contact with the contact lip and thus makes an electrically-conductive connection between the plug piece and the conductive contact sleeve and consequently the receiver piece.

The contact sleeve may be fixed in the axial direction in the receiver piece. Thus precise positioning of the contact lip relative to the receiver piece is possible if desired, which ensures a reliable electrical contact between the plug piece and the receiver piece. For fixing the contact sleeve, on its outer periphery at least one catch element may be provided which engages in a corresponding recess provided on the inner periphery of the receiver piece. Thus the contact sleeve may be produced independently and separately from the receiver piece and inserted in the receiver piece in a later assembly step in an easy manner if desired. Thus also further components, which viewed in the insertion direction of the plug piece lie behind the contact sleeve, may easily be inserted in the receiver piece if desired.

On the inner periphery of the receiver piece may be arranged at least one sealing element which may surround the plug piece media-tight over the full periphery in the connection position. A suitable sealing element may for example be an O-ring, in particular a non-electrically-conductive O-ring. The sealing element may be arranged behind the contact sleeve viewed in the insertion direction of the plug piece. In another example, the electrically-conductive connection created by the contact lip between the plug piece and the receiver piece may lie outside the wet area of the fast coupling apparatus. Consequently, the fuel for example may not exert any harmful or corrosive effect on the material of the contact lip. The fast coupling apparatus can thus provide a reliable, electrically-conductive connection even over a long operating period, when compared with previous fast coupling apparatus designs.

In some examples, the at least one sealing element may be fixed in the axial direction in the receiver piece by the contact sleeve. In this way, two functions can be combined in the contact sleeve or contact lip, which decreases production costs of the fast coupling apparatus. The contact sleeve firstly may create an electrically-conductive connection between the plug piece and the receiver piece, and secondly may fix the sealing element in the axial direction in the receiver piece. In addition this allows quick and inexpensive construction and assembly of the fast coupling apparatus including several individual components. However, other configurations have been contemplated.

The plug piece may be held by a locking mechanism acting on the collar element in the connection position. Consequently, the collar element (e.g., flange element) of the plug piece may act as a support surface for the contact lip and at the same time provides an element cooperating with the locking mechanism.

FIG. 1 shows an example of a fast coupling apparatus 1 in a side section view. The fast coupling apparatus 1 shown includes a plug piece 2 and a receiver piece 3 which are each coupled to (e.g., mounted on) a line end, not shown in FIG. 1, of media-carrying lines or hoses, in particular fuel lines of motor vehicles. The plug piece 2 may be an adapter of the fast coupling apparatus 1, the receiver piece 3 may be a coupling.

In the example shown in FIG. 1, the receiver piece 3 may form the housing of the fast coupling apparatus 1. In this way, construction and assembly of the fast coupling apparatus 1 including several individual components, may be simplified thereby decreasing production costs. The receiver piece 3 in another example may be held or accommodated in a housing of the fast coupling apparatus so that the receiver piece 3 and housing would be two separate parts, if desired.

At the left end region of the receiver piece 3 shown in FIG. 1 can be seen a line connection 4 for a line end 50. The line end 50 and the receiver piece 3 are not coupled in the depicted example. However, the line end 50 of a media-carrying line 52 may be connected to the receiver piece 3 such that the line end may be pushed onto the line connection 4, denoted via arrow 54. Therefore, when the line end 50 is coupled to the receiver piece the housing 56 of the media-carrying line 52 at least partially encloses the line connection 5 and in particular hook elements 5. Additionally, the line end 50 may be coupled to the receiver piece such that a substantially media tight seal is formed. In the example shown the line connection 4 has hook elements 5 which enable the connection with the media-carrying line to be simple to create but relatively difficult to release again. Instead of the hook elements 5, the line connection 4 may also be formed in an undulating manner.

Additionally or alternatively to the hooks 5, the line end 50 can be held on the line connection 4 by fixing devices for example hose clamps, clips, ties and similar. The plug piece 2 is also connected with a line end 60 of another media-carrying line 62 or hose in a similar manner or through another suitable connection technique. In the depicted example, the line end 60 is coupled to the plug piece 2. It will be appreciated that in some examples fuel flows from the line end 60 to the line end 52 or vice-versa, through the fast coupling apparatus 1.

The plug piece 2 and receiver piece 3, as shown in FIG. 1, may be coupled together media-tight. That is to say, that liquid, gas, and/or vapor may be substantially inhibited from flowing out of the connection between the plug and receiver piece to the exterior of the fast coupling apparatus 1. The receiver piece 3 at least partially surrounds the plug piece 2. FIG. 1 shows the fast coupling apparatus 1 in a connection state. In the depicted example, on the inner periphery 64 of the receiver piece 3 of the fast coupling apparatus 1 are provided two sealing elements 6 which surround the plug piece 2 media-tight over the periphery (e.g., entire periphery) in the connection position. The electrically-conductive contact sleeve 10 is axially positioned between the collar element 12 and the sealing elements 6, the sealing elements 6 are in contact with the receiver piece 3 and the plug piece 2, in the depicted example. However, other relative positions of the contact sleeve, the collar element, and the sealing elements have been contemplated. The sealing elements 6 shown in the example in FIG. 1 are O-rings (e.g., non-electrically-conductive O-rings). As shown in FIG. 1, the O-rings 6 are arranged spaced apart in the axial direction by a spacer element 7, for example a spacer ring. However, other O-ring positions have been contemplated. A central axis 70 of the fast coupling apparatus 1 is provided for reference. The central axis 70 may be a longitudinal axis of the plug piece 2 and/or the receiver piece 2. The O-rings 6 enable a seal so that the fast coupling apparatus 1 includes a wet region 8 which lies to the left of the left-hand sealing element 6 and into which for example fuel can flow, and a dry region 9 which lies to the right of the right sealing element 6 and may be free from fuel or medium carried by the line.

As further shown in FIG. 1, on the inner periphery 64 of the receiver piece 3 is arranged an electrically-conductive contact sleeve 10. Therefore, the inner periphery 64 is in electrically-conductive contact (e.g., face sharing contact) with an outer surface 80 of the contact sleeve 10. In this way, the receiver piece 3 touches the contact sleeve 10 and the contact sleeve 10 is furthermore connected electrically-conductively with the receiver piece 3. An electrically-conductive contact lip 11 is also provided on the contact sleeve 10 and protruding from its surface, which touches the plug piece 2 in the connection position as shown in FIG. 1. The contact sleeve 10 is also positioned between (e.g., radially positioned between) the plug piece 2 and the receiver piece 3.

The contact lip 11, in the connection position of the fast coupling apparatus 1 shown in FIG. 1, enables a reliable, electrically-conductive connection between the plug piece 2 and the receiver piece 3. The contact resistance between these components is thereby significantly reduced as the plug piece 2 and the receiver piece 3 are in contact with each other via the contact lip 11. The contact lip 11 may be substantially independent of the production or specification tolerances relating to the fast coupling apparatus 1, (e.g., the contact resistance is not substantially affected by the production tolerances of the fast coupling apparatus 1, if desired). However, other contact lip configurations have been contemplated.

Figure 2:
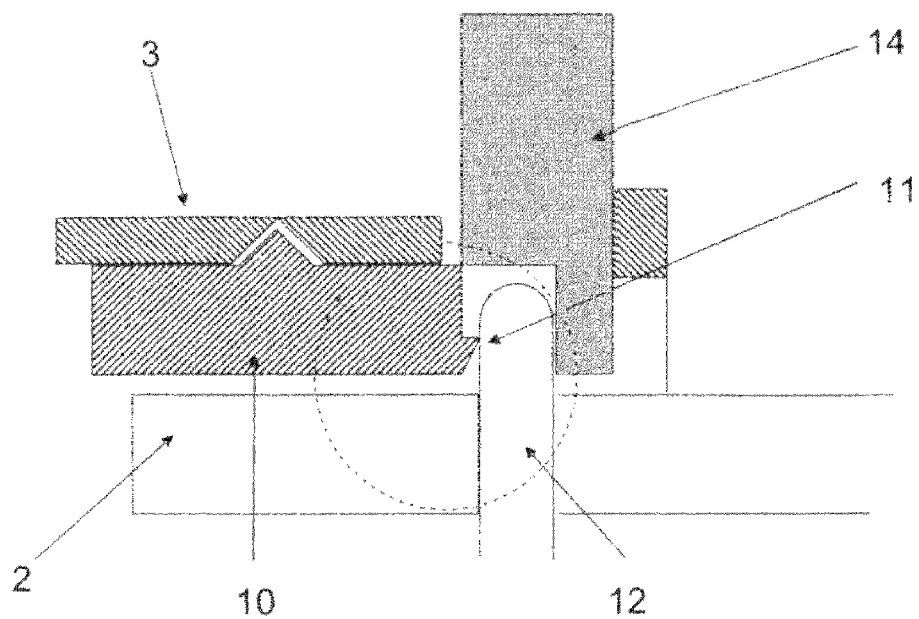
FIG. 2 shows an enlarged view of the fast coupling apparatus shown in FIG. 1.

In particular in the example of the fast coupling apparatus 1 shown in FIG. 1, the contact lip 11 extends substantially parallel to the longitudinal extent of the plug piece 2. However, other relative positions between the contact lip and the plug piece have been contemplated. The plug piece 2 also has a collar element 12 (e.g., flange element) on its outer periphery on which the contact lip 11 lies in the connection position, as shown in FIG. 2. In some examples, the collar element 12 and the plug piece 2 may be continuously formed. However, in other examples, the collar element and plug piece may be separately constructed. In the depicted example, the collar element 12 is radially aligned. A radial axis 72 is provided for reference. However, other relative positions of the collar element have been contemplated. The parts in FIG. 2 carry the same reference numerals as the reference numerals in FIG. 1. To avoid redundancy similar parts are not described twice. The collar element allows the process of inserting plug piece 2 into the receiver piece 3 to be performed with particularly low insertion force as the contact lip 11 is not already in contact with the plug piece 2 at the start of the insertion process, if desired. For example, if the contact lip 11 were to extend in a radial direction to the plug piece 2, wherein the contact lip 11 would thus touch the plug piece 2 on the outer periphery. In this way, the electrically-conductive contact sleeve 10 (e.g., the contact lip 11 of the contact sleeve) in electrically-conductive contact (e.g., direct contact) with an outer periphery 84 of the plug piece 2. The exterior of the collar element 12 is included in the outer periphery 84 of the plug piece 2. When the insertion process is completed the collar element 12 (e.g., flange element) formed on the outer periphery of plug piece 2 comes into contact with the contact lip 11 and create the electrically-conductive connection between the plug piece 2 and the conductive contact sleeve 10 and consequently the receiver piece 3.

Additionally, the contact sleeve 11 is spaced away from an axially aligned portion 86 (e.g., axially aligned exterior surface) of the plug piece 2, in the depicted example. Further, in FIG. 1, the contact lip 11 is shown in the form of a hook. It can however also have other forms suitable for providing the function of the contact lip 11 described herein, if desired. In particular the contact lip 11 may be formed of a flexible material, if desired. Thus on the process of inserting the plug piece 2 in the receiver piece 3, the contact lip 11 may yield elastically in certain limits of the push-in force of plug piece 2, in particular the component of the push-in force acting on the contact lip 11 during the insertion process. The elastic resilience of the contact lip 11 enables a reliable electrical contact between the plug piece 2 and the receiver piece 3 which may be independent of the production tolerances of the plug piece 2 and the receiver piece 3 of the plug coupling 1.

As can be further gathered from FIG. 1, the contact sleeve 10 can be fixed in the axial direction in the receiver piece 3. For this the contact sleeve 10 may have at least one catch element 13 which engages in a corresponding recess provided on the inner periphery of the receiver piece 3. Therefore, the electrically-conductive contact sleeve 10 may include a catch element 13 mated with a recess 90 in the receiver piece 3. Thus precise positioning of the contact lip 11 may be achieved relative to receiver piece 3, enabling a reliable electrical contact between the plug piece 2 and the receiver piece 3. Furthermore the contact sleeve 10 may be produced separately from the receiver piece 3 and inserted in the receiver piece 3 in a later assembly stage. Thus further components can be inserted in the receiver piece 3 which, like the sealing elements 6 and spacer element 7 already described, may be positioned behind the contact sleeve 10 in the receiver piece 3 viewed in an insertion direction 92 of the plug piece 2.

Since the sealing elements 6, as already described, in the example of the fast coupling apparatus 1 shown in FIG. 1 are arranged behind the contact sleeve 10 viewed in the insertion direction 92 of the plug piece 2, the electrically-conductive connection between the plug piece 2 and the receiver piece 3 created by the contact lip 11 lies outside the wet region 8 of the fast coupling apparatus 1. For example the fuel carried by the lines may not exert harmful or aggressive influence on the material of the contact lip 11. Thus the fast coupling apparatus 1 provides a reliable electrically-conductive connection created, via the contact lip 11, between the plug piece 2 and the receiver piece 3 even over a long operating period, in particular over the lifespan of the fast coupling apparatus 1.

The sealing elements 6 and spacer element 7 in the example shown in FIG. 1 may be fixed in the axial direction in receiver piece 3 by the contact sleeve 10, if desired. Thus the contact sleeve 10 may perform two functions, namely firstly provision of an electrically-conductive connection between the plug piece 2 and receiver piece 3 and secondly the axial fixing of the sealing elements 6 and spacer element 7, if desired. This allows a reduction in the number of components and thus reduces the production costs of the fast coupling apparatus 1.

As furthermore shown in FIG. 1, the plug piece 2 may be in the connection position by a locking mechanism acting on the collar element 12. The locking mechanism may have at least one locking element 14 which in the locking position shown in FIG. 1 presses against the collar element 12 (e.g., flange element) in the insertion direction 92 of plug piece 2, and thus reduces the likelihood of undesirable slippage of the plug piece 2 out of the receiver piece 3. The locking element 14 may move in a radial direction, denoted via arrow 96, in response to a radial force exerted by a person to enable locking and unlocking of the locking element.

The connection state of plug piece 2 with receiver piece 3 may be released again by moving the locking element into an unlocked position not shown in FIG. 1, in some examples. The release of the connection state between the plug 2 and receiver piece 3 may also be achieved by the flexible contact lip 11 due to its elastic resilience which generates spring force against the insertion direction 92 of plug piece 2 with which the contact lip 11 in the example shown presses against the collar element 12. However, in other examples, the flexible contact lip may have another configuration. The collar element 12 (e.g., flange element) of the plug piece 2 may serve firstly as a support surface for the contact lip 11 in the manner already described and secondly cooperates with the locking mechanism.

In one example the fast coupling apparatus may be used in a fuel line system of a motor vehicle. Such a fuel line or fuel supply system of a motor vehicle which may be driven for example by a petrol or diesel combustion engine may have a fuel tank with an active or passive delivery module to supply fuel to the combustion engine via fuel lines. Such fuel lines may include a multiplicity of line elements which can be designed for example as pipes, flexible hoses or similar.

Although the fast coupling apparatus has been described substantially with reference to a fuel supply system for motor vehicles, it is however in no way restricted to this. Thus the fast coupling apparatus can for example be used in a system to supply a heating system, a power station or similar.

It will be appreciated that the configurations disclosed herein are exemplary in nature, and that these specific embodiments are not to be considered in a limiting sense, because numerous variations are possible. For example, the above technology can be applied to a motor vehicle including an engine such as an opposed engines, V type engines, etc. The above technology may also be applied to heating systems, power stations, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fast coupling apparatus on a media-carrying line, comprising:
a plug piece arranged on a first line end;
a receiver piece arranged on a second line end coupled together with the plug piece; and
an electrically-conductive contact sleeve arranged on an inner periphery of the receiver piece, the electrically-conductive contact sleeve electrically-conductively connected with the receiver piece and having a contact lip that protrudes from a surface of the contact sleeve and touches the plug piece in a connected position.

2. The fast coupling apparatus of claim 1, wherein the electrically-conductive contact lip comprises a flexible material.

3. The fast coupling apparatus of claim 1, where a collar element is formed on the outer periphery of the plug piece, in the connected position the contact lip is oriented parallel to the longitudinal axis of the plug piece.

4. The fast coupling apparatus of claim 1, wherein the contact sleeve is fixed in the axial direction with regard to the receiver piece.

5. The fast coupling apparatus of claim 1, further comprising at least one catch element positioned on the outer periphery of the contact sleeve, the at least one catch element engaging in a corresponding recess, the corresponding recess positioned on the inner periphery of the receiver piece.

6. The fast coupling apparatus of claim 1, further comprising at least one sealing element positioned in the inner periphery of the receiver piece and arranged behind the contact sleeve with regard to the insertion direction of the plug piece, the sealing element surrounding the whole periphery of the plug piece in the connected position, the sealing element forming a media tight seal with the plug piece.

7. The fast coupling apparatus of claim 1, wherein the at least one sealing element is fixed in an axial direction by the contact sleeve.

8. The fast coupling apparatus of claim 1, wherein the plug piece is held in the connected position by a locking mechanism acting on the collar element.

9. The fast coupling apparatus of claim 1, where the contact sleeve is a contact ring.

10. The fast coupling apparatus of claim 1, where the media carrying line is a hose in a motor vehicle.

11. The fast coupling apparatus of claim 1, where the receiver piece is coupled with the plug piece to form a media tight barrier.

12. A quick coupling apparatus in a vehicle, comprising:
a plug piece coupled to a first line end;
a receiver piece coupled to a second line end in fluidic communication with the first line end, the receiver piece surrounding the plug piece; and
an electrically-conductive contact sleeve positioned between the receiver piece and the plug piece and in electrically-conductive contact with an inner periphery of the receiver piece and outer periphery of the plug piece.

13. The quick coupling apparatus of claim 12, where the outer periphery of the plug piece is a collar element included in the plug piece.

14. The quick coupling apparatus of claim 13, where the collar element is radially aligned.

15. The quick coupling apparatus of claim 13, where the contact sleeve is spaced away from an axially aligned portion of the plug piece.

16. The quick coupling apparatus of claim 13, where electrically-conductive contact sleeve is axially positioned between the collar element and a sealing element, the sealing element in contact with the receiver piece and the plug piece.

17. The quick coupling apparatus of claim 12, where fuel flows between the first line end and the second line end.

18. The quick coupling apparatus of claim 12, where the electrically-conductive contact sleeve includes a catch element mated with a recess in the receiver piece.

* * * * *